US010378680B2

(12) United States Patent
Anderson

(10) Patent No.: US 10,378,680 B2
(45) Date of Patent: Aug. 13, 2019

(54) TELESCOPING PIPE STAND

(71) Applicant: ERICO INTERNATIONAL CORPORATION, Solon, OH (US)

(72) Inventor: Scott Anderson, Garrettsville, OH (US)

(73) Assignee: ERICO INTERNATIONAL CORPORATION, Solon, OH (US)

(*) Notice: Subject to any disclaimer, the term of this patent is extended or adjusted under 35 U.S.C. 154(b) by 0 days.

(21) Appl. No.: 15/994,404

(22) Filed: May 31, 2018

(65) Prior Publication Data

US 2018/0347726 A1 Dec. 6, 2018

Related U.S. Application Data

(60) Provisional application No. 62/512,982, filed on May 31, 2017.

(51) Int. Cl.
*F16L 3/00* (2006.01)
*F16L 3/20* (2006.01)
*F16L 3/10* (2006.01)
*F16M 11/28* (2006.01)

(52) U.S. Cl.
CPC ........... *F16L 3/20* (2013.01); *F16L 3/1091* (2013.01); *F16M 11/28* (2013.01)

(58) Field of Classification Search
CPC ............ H02G 3/32; B60R 2011/0071; B60R 16/0207; F16L 3/12
USPC ..... 248/49, 62, 65, 68.1, 70, 73, 80, 83, 85, 248/89
See application file for complete search history.

(56) References Cited

U.S. PATENT DOCUMENTS

| 2,504,291 A | 4/1950 | Alderfer |
| 2,684,222 A | 7/1954 | Miller |
| 3,313,505 A | 4/1967 | Petrie |
| 3,655,161 A | 4/1972 | Schueler |
| 4,221,362 A | 9/1980 | Van Santen |
| 4,249,759 A | 2/1981 | Heckethorn |
| 4,684,097 A | 8/1987 | Cox |
| 4,793,578 A * | 12/1988 | Howard ............... F16L 3/222 248/62 |
| 5,819,482 A | 10/1998 | Belke et al. |

(Continued)

FOREIGN PATENT DOCUMENTS

| CN | 202972185 U | 6/2013 |
| CN | 205559998 U | 9/2016 |

OTHER PUBLICATIONS

Eaton; Pipe Supports, Guides, Shields & Saddles; product catalog; retrieved from the internet Aug. 22, 2018; 46 pages.

(Continued)

*Primary Examiner* — Steven M Marsh
(74) *Attorney, Agent, or Firm* — Quarles & Brady LLP

(57) ABSTRACT

A telescoping stand for supporting an elevated object can include a first support member, a second support member, and a third support member. The second support member can be configured to telescopically engage with the first support member. The locking element can be configured to lock the first and second support members against relative telescopic movement to provide any one of a plurality of telescoped heights. The third support member can be adjusted relative to the first and second support members to support the elevated object at any one of a plurality of object heights above the first and second support members.

19 Claims, 4 Drawing Sheets

(56) References Cited

U.S. PATENT DOCUMENTS

| | | | |
|---|---|---|---|
| 5,862,635 | A | 1/1999 | Linse et al. |
| 6,442,906 | B1 | 9/2002 | Hwang |
| 6,505,803 | B1 | 1/2003 | Hernandez |
| 6,536,717 | B2 | 3/2003 | Parker |
| 6,612,533 | B2 | 9/2003 | Biles et al. |
| 6,679,460 | B2 | 1/2004 | Nicolia et al. |
| 6,874,739 | B1 | 4/2005 | Gregory |
| 6,874,764 | B2 | 4/2005 | Drake, III |
| 7,490,813 | B1 | 2/2009 | Weddle |
| 7,780,122 | B1 | 8/2010 | Herbers |
| 8,994,935 | B2 * | 3/2015 | Kinney ............ G01B 11/27 356/138 |
| 9,605,773 | B1 | 3/2017 | Tarapchak |
| 9,714,726 | B1 | 7/2017 | Laidley et al. |
| 2002/0011548 | A1 | 1/2002 | Parker |
| 2008/0203265 | A1 | 8/2008 | Zhang |
| 2014/0166824 | A1 | 6/2014 | Tarapchak |
| 2015/0210341 | A1 | 7/2015 | Chen |

OTHER PUBLICATIONS

Pipeline Products; Pipe Supports; screen shot of web page; retrieved from the internet Aug. 22, 2018; 1 pages.

Anvil International; Pipe Hangers & Supports; price list and condensed catalog; Copyright 2017; Revision Date: Jan. 30, 2017; 80 pages.

\* cited by examiner

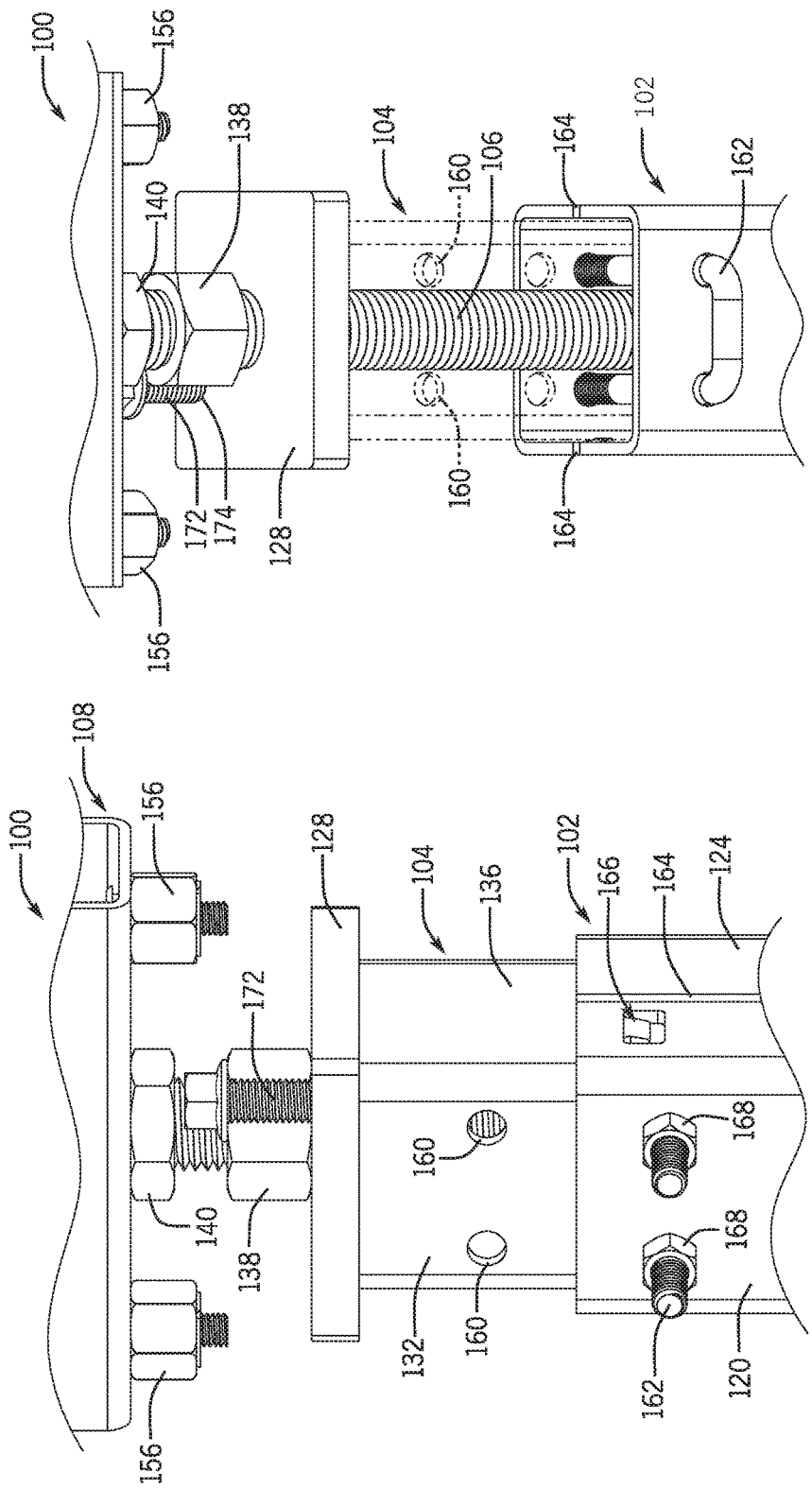

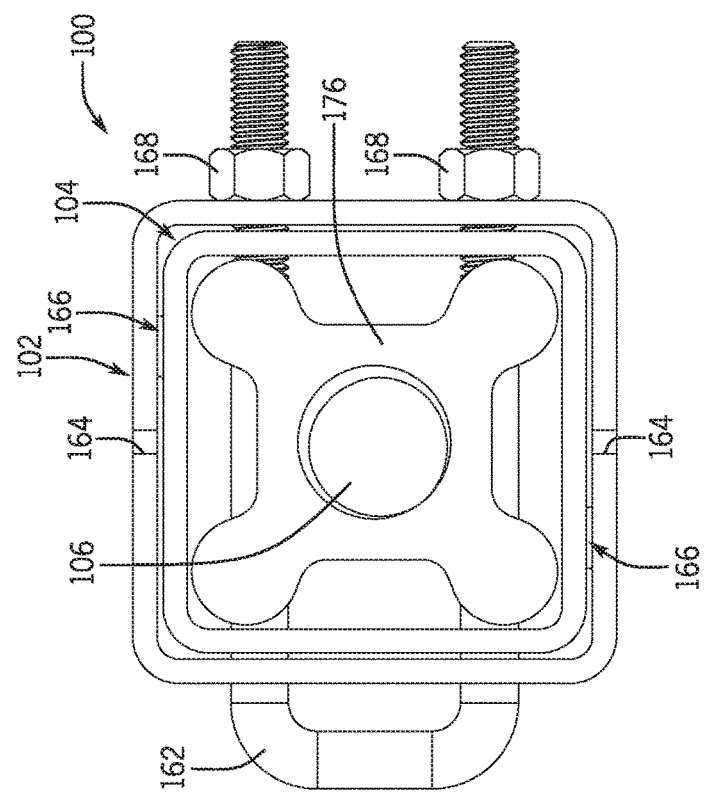
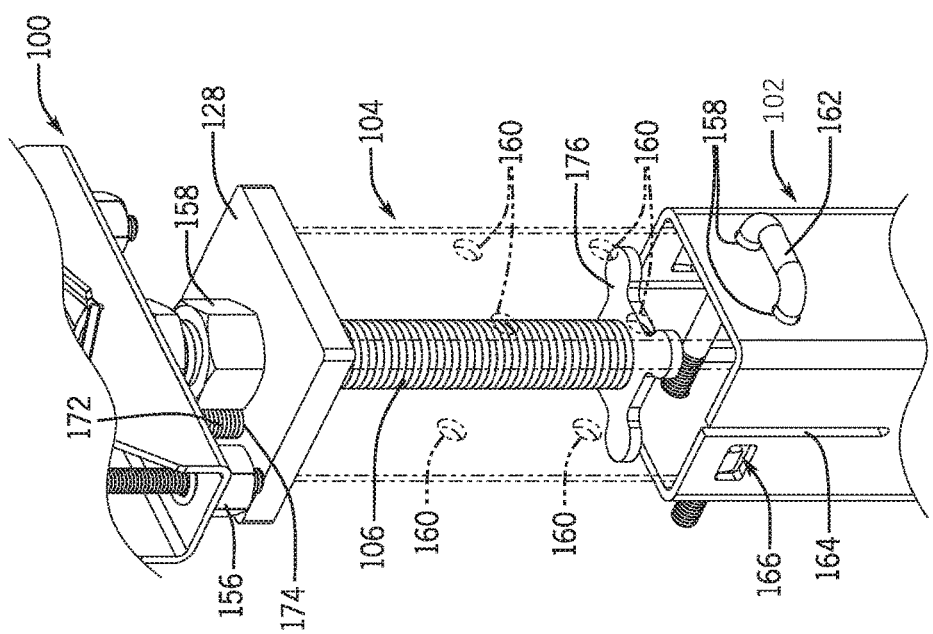

US 10,378,680 B2

TELESCOPING PIPE STAND

CROSS-REFERENCE TO RELATED APPLICATIONS

This application claims priority to U.S. Provisional Patent Application No. 62/512,982, titled "Telescoping Pipe Stand" and file May 31, 2017, the entirety of which is incorporated herein by reference.

BACKGROUND

In many applications, it may be useful to provide support to an elevated structure, in order to support the elevated structure at a given height and balance at least a portion of a weight of the structure. For example, it may be useful to structurally support a pipe or another structure that is arranged at a given height.

SUMMARY

Some embodiments of the invention provide a telescoping pipe stand for supporting an elevated object. The telescoping pipe stand can include a first tube, a second tube, an adjustment rod, an adjustment nut, and a pipe support. The first tube can be shaped to form an internal passageway and can include a first side and a second side each having a set of apertures arranged thereon. The second tube can be configured to be at least partially inserted telescopically into the internal passageway of the first tube and can include a first tube side, a second tube side, and an end plate with a plate aperture. Each of the first and second sides of the second tube can include a plurality of sets of apertures arranged longitudinally therealong with one or more predefined distances therebetween. The locking element can be configured to be inserted through each of the pair of apertures of the first tube and, selectively, each of the sets of apertures of the second tube. The adjustment rod can be configured to be at least partially inserted through the plate aperture and into the second tube. The adjustment nut can be disposed to support the adjustment rod relative to the end plate. The pipe support can be attached to an end of the adjustment rod. The pipe support can be configured to engage a portion of the elevated object to support the elevated object. A height of the pipe support can be configured to be selectively adjusted with a first height adjustment that can be controlled by selectively aligning one set of the plurality of sets of apertures of the second tube with each of the sets of apertures of the first tube, and a second height adjustment that can be controlled by selective rotation of the adjustment nut.

Some embodiments of the invention provide a telescoping pipe stand for supporting an elevated object. The telescoping pipe stand can include a first support member, a second support member, a third support member, and an adjustment element. The second support member can be configured to telescopically engage with the first support member. The locking element can be configured to lock the first and second support members against relative telescopic movement with the first and second support members providing any one of a plurality of telescoped heights. The adjustment element can be configured to rotate to move the third support member relative to the second support member to support the elevated object at any one of a plurality of object heights above the first and second support members.

Some embodiments of the invention provide a method of supporting an elevated object using a telescoping pipe stand. The telescoping pipe stand can include a first support member, a second support member, a third support member, a locking element, and an adjustment element. The method can include telescopically adjusting the first and second support members to, and using the locking element to secure the first and second support members in, any of a plurality of discrete telescoped heights. The method can further include rotating the adjustment element to dispose the third support member at any of a continuous plurality of heights above the first and second support members, and supporting the elevated object with the third support member.

Some embodiments of the invention provide a telescoping stand for supporting a pipe. A first support member can include first-support apertures arranged in at least a first row and a second row. A second support member can include at least a first second-support aperture and a second second-support aperture. A third support member can be supported by and can extend into the first and second support members. A support body can be connected to the third support member and can be configured to support the pipe. A locking element can include a first leg and a second leg. The first and second support members can be telescopically adjustable relative to each other to adjust a height of the support body, with the first row of the first-support apertures aligned with the first second-support aperture and the second row of the first-support apertures aligned with the second second-support aperture. The third support member can be movable relative to the first and second support members to further adjust the height of the support body. The locking element can be configured, in an installed configuration, to secure the first support member relative to the second support member via insertion of the first leg through the first second-support aperture and an aligned aperture of the first row of the first-support apertures and insertion of the second leg through the second second-support aperture and an aligned aperture of the second row of the first-support apertures, with the third support member extending past the locking element between the first and second legs.

Some embodiments of the invention provide a telescoping pipe stand for supporting an elevated object. The telescoping pipe stand can include a first support member, a second support member configured to telescopically engage with the first support member, a third support member, a locking element having a first leg and a second leg, and an adjustment element. The first and second legs can be configured to engage the first and second support members lock the first and second support members against relative telescopic movement, with the third support member extending between the first and second legs, to arrange the first and second support members to provide any one of a plurality of telescoped heights. The adjustment element can be configured to rotate to dispose the third support member to support the elevated object at any one of a plurality of object heights above any one of the plurality of telescoped heights.

Some embodiments of the invention provide method of supporting an elevated object using a telescoping stand with a first support member, a second support member, a third support member, an adjustment element, and a locking element with a first leg and a second leg. The first and second support members can be telescopically adjusted relative to each other, to provide any one of a plurality of discrete telescoped heights. The first and second legs can be engaged with the first and second support members, with the third support member extending between the first and second legs, to secure the first and second support members to provide any one of the plurality of discrete telescoped heights. The adjustment element can be rotated to slidably adjust the third support member to support the elevated object at any of a continuous plurality of heights above the first and second support members. The elevated object can be supported with the third support member.

DESCRIPTION OF THE DRAWINGS

FIG. 4 is a back, left isometric partial view of a longitudinal end of the telescoping arrangement of the telescoping pipe stand of FIG. 1.

FIG. 5 is a partial top, front isometric view of the longitudinal end of the telescoping arrangement of the telescoping pipe stand of FIG. 1, with the second tube rendered transparently.

FIG. 6 is a partial top, front, left isometric view of the longitudinal end of the telescoping arrangement of the telescoping pipe stand of FIG. 1, with the second tube rendered transparently.

FIG. 7 is a top sectional partial view of the telescoping pipe stand of FIG. 1 taken along plane 7-7 of FIG. 3.

DETAILED DESCRIPTION

Figure 1:
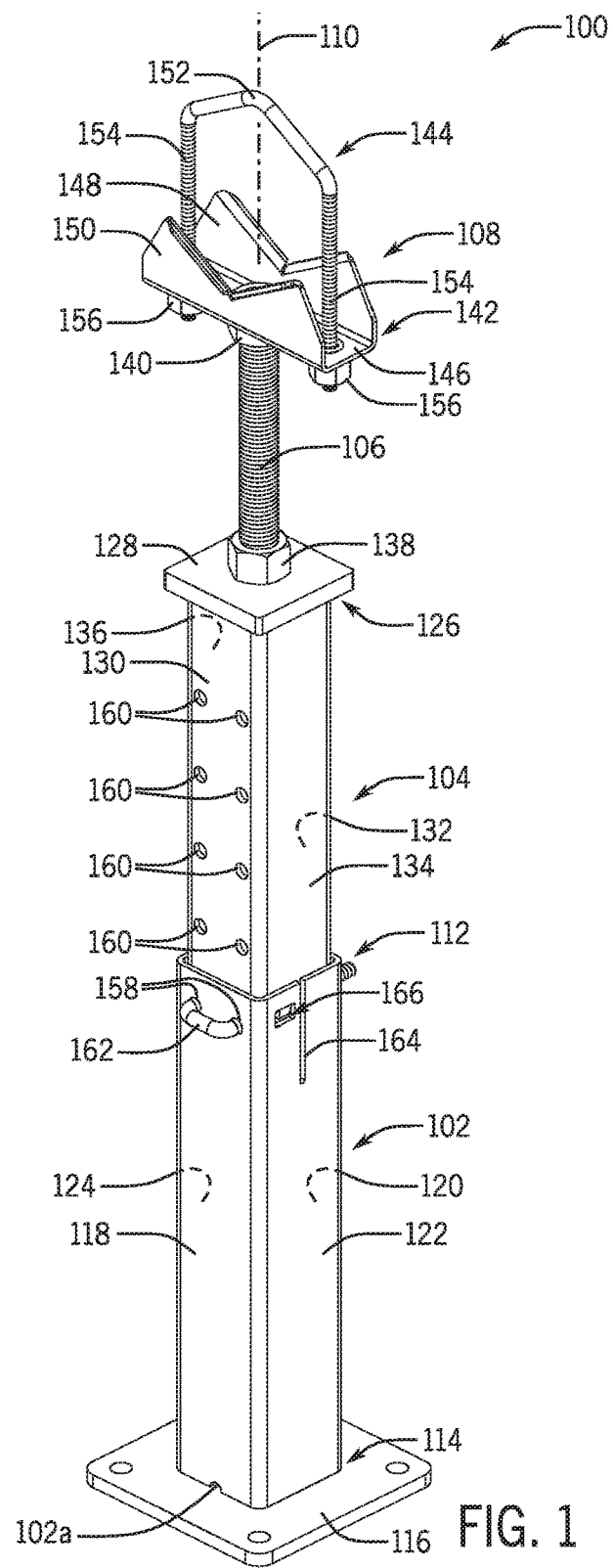
FIG. 1 is a top, front, right isometric view of a telescoping pipe stand according to one embodiment of the invention, with a telescoping arrangement that includes a first tube and a second tube.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In the discussion below, some examples describe telescoping stands for supporting certain suspended object, such as pipes or other tubular structures. It will be understood that these objects, and the associated configurations, are presented as examples only. Embodiments of the disclosed telescoping stand can be used to support other objects, such as other tubular structures, conduits or ducts of non-tubular geometry, or other objects generally.

Generally embodiments of the invention can provide a stand that can be relatively easily adjusted to provide different support heights for a pipe (or other object) while also exhibiting appropriate structural strength once secured at a particular support height. Some embodiments can include first and second adjustable sections, with the first adjustable section exhibiting a different adjustment mechanism than the second adjustment section. For example, some embodiments can include a telescoping section for relatively large scale (or "coarser") adjustments, and a threadably adjustable section for relatively small scale (or "finer") adjustments. In this way, for example, an operator can relatively easily adjust the relevant stand to any number of support heights for an elevated object.

In some embodiments, a locking mechanism can be provided. For example, in embodiments with a telescoping adjustment section, a junction between two telescoping members can be formed with a resiliently deformable portion, which can be selectively clamped or otherwise engaged to prevent relative movement between the telescoping members. In some embodiments, clamping a junction between two telescoping members can include constricting an outer one of the telescoping members relative to an inner one of the telescoping members.

As another example, in some embodiments, a locking mechanism on a telescoping stand can include a locking element with at least two legs. Both legs can be extended through first and second support members on the stand, in order to lock the first and second support members against telescopic movement. Further, a spacing between the two legs can provide clearance for a third support member to pass between the legs, thereby providing a highly adjustable overall arrangement.

In some embodiments, different adjustment mechanisms can separately provide discrete and continuous adjustment, respectively, of a support height for an object. For example, a telescoping section can provide discrete adjustment between a finite number of preset heights, and a rotatably or slidably adjustable section can provide continuous adjustment along a continuous range of heights. This can be useful, for example, to allow for relatively quick coarse and fine adjustment of the stand to support an object at any of a number of particular heights.

In some embodiments, an adjustable section for continuous adjustment can facilitate a combination of rotational and slidable adjustment. For example, an adjustment element, such as a nut, can be configured to be rotated in order to slidably adjust an adjustable support member, such as a threaded rod, relative to telescoping support members.

FIG. 1 illustrates a telescoping pipe stand 100 according to one embodiment of the invention. In some embodiments, the telescoping pipe stand 100 can be configured to support an elevated structure. For example, the telescoping pipe stand 100 can be configured to support a circular pipe (not shown) at a given height. In other embodiments, for example, the telescoping pipe stand 100 can be used to suspend another type of pipe, a duct or conduit, or another structure.

In some embodiments, the telescoping pipe stand 100 can be used to support a pipe (or other object) above a roof or a floor of a building. In some embodiments, the telescoping pipe stand 100 can be used in other settings.

In the embodiment illustrated, the telescoping pipe stand 100 includes first and second support members configured as first and second tubes 102, 104, a third support member configured as an adjustment rod 106, and a support body 108 configured to support an elevated object. The first tube 102, the second tube 104, and the adjustment rod 106 are arranged longitudinally along a generally central axis 110, along which a central passage extends axially through the first tube 102 and the second tube 104 (e.g., generally vertically, from the perspective of FIG. 1).

The first tube 102 extends generally axially between a first end 112 and a second end 114. The first end 112 of the first tube 102 is generally open and is configured to receive at least a portion of the second tube 104, to allow at least a portion of the second tube 104 to extend into the central passage of the first tube 102.

To support the pipe stand 100 relative to other structures, the second end 114 of the first tube 102 can be coupled to a base plate 116. This may be useful, for example, to allow the first tube 102, and thereby the telescoping pipe stand 100, to be secured to a floor or another base structure. In other embodiments, other arrangements are possible to secure or support a stand relative to another structure.

In some embodiments, drainage features can be provided, such as drainage holes 102a extending into the first tube 102 adjacent to the base plate 116. This can be useful, for example, in order to release water or other liquid that may have infiltrated the pipe stand 100 generally, and the first tube 102 in particular.

In the illustrated embodiment, the first tube 102 defines a generally hollow, rectangular (e.g., square) cross-sectional shape and includes a first side 118, a second side 120, and a third side 122, and a fourth side 124. In other embodiments, the first tube 102 may define a generally round or other cross-sectional shape, as appropriate for a given application.

Also in the embodiment illustrated, the first tube 102 exhibits a generally constant cross-sectional area, with each of the first, second, third, and fourth sides 118, 120, 122, 124 generally extending axially between the first end 112 and the second end 114 of the first tube 102. Correspondingly, the first and second sides 118, 120 are laterally opposed and arranged generally parallel to one another. Likewise, the third and fourth sides 122, 124, which are arranged generally transverse to the first and second sides 118, 120, are laterally opposed and arranged generally parallel to one another.

Generally, the second tube 104 extends axially between a first end 126 and a second end (hidden from view by the first tube 102 in the FIGS.). In the embodiment illustrated, the first end 126 of the second tube is coupled to an end plate 128, through which the adjustment rod 106 extends. The second end (not shown) of the second tube 104 can be dimensioned to be received through the first end 112 of the first tube 102, and the central passage of the first tube 102 generally, to provide a telescoping engagement between the first tube 102 and the second tube 104. As such, at least a portion of the second tube 104 can be slidably received within the first end 112 of the first tube 102 to provide for telescopic adjustment of an axial height of the end plate 128 relative to the base plate 116.

Similarly to the first tube 102, in the embodiment illustrated, the second tube 104 defines a generally hollow, generally rectangular (e.g., square) cross-sectional shape and includes a first side 130, a second side 132, and a third side 134, and a fourth side 136. In other embodiments, the second tube 104 may define a generally round or other cross-sectional shape, as desired.

Also similarly to the first tube 102, the second tube 104 exhibits a generally constant cross-sectional area, with each of the first, second, third, and fourth sides 130, 132, 134, 136 generally extending axially between the first end 126 and the second end (not shown) of the second tube 104. Correspondingly, the first and second sides 130, 132 are laterally opposed and arranged generally parallel to one another. Likewise, the third and fourth sides 134, 136, which are arranged generally transverse to the first and second sides 130, 132, are laterally opposed and arranged generally parallel to one another.

In the embodiment illustrated, the adjustment rod 106 is generally configured to provide additional adjustment of a total height of the pipe stand 100, as a supplement to telescoping adjustment of the first and second tubes 102, 104. For example, as illustrated in FIGS. 5 and 6 in particular, at least a portion of the adjustment rod 106 can be received through an aperture in the end plate 128 so that the adjustment rod 106 can extend within, as well as axially outside of (i.e., above, as illustrated), the first and second tubes 102, 104. In some embodiments, the aperture in the end plate 128 may be a circular bore dimensioned to allow at least a portion of the adjustment rod 106 to slide axially therethrough, without rotation of the adjustment rod 106. In other embodiments, other configurations are possible.

In some embodiments, the adjustment rod 106 or another support member can be configured to be adjusted via actuation of a separate adjustment element. For example, in the illustrated embodiments, an adjustment nut 138 is threadably engaged with the adjustment rod 106, and is supported by (e.g., in direct, but removable, engagement with) the end plate 128. Further, the adjustment rod 106 is configured as a threaded rod or jack screw. Accordingly, the adjustment nut 138 can be manipulated to control an axial height with which the adjustment rod 106 protrudes from the end plate 128. For example, as also discussed below, the adjustment nut can be rotated relative to the end plate 128 in order to slidably adjust the adjustment rod 106 relative to the end plate 128, without necessarily rotating the adjustment rod 106 or the support body 108. In other embodiments, other configurations are possible.

In some embodiments, an adjustment element can rest on support surface of a telescoping arrangement, without being specifically secured to the support surface. For example, in the illustrated embodiment, the nut 138 can simply rest on the top surface of the end plate 128 to support the adjustment rod 106 relative to the telescoping arrangement provided by the first and second tubes 102, 104. In other embodiments, an adjustment element can be otherwise attached to a relevant support body.

Generally, one end of the adjustment rod 106 can be coupled to the support body 108 and another opposing end of the adjustment rod 106 can extend through the aperture in the end plate 128 and into the internal passageway of the first and second tubes 102, 104. In some embodiments, as also described above, the adjustment rod 106 can be supported relative to the first and second tubes 102, 104 by an adjustment element, such as the adjustment nut 138. In some embodiments, a further element can be provided to secure the support body 108 at a particular position or orientation on the adjustment rod 106 (e.g., opposite the relevant adjustment element). For example, a securing element such as a clamp nut 140 can be configured to fasten the support body 108 to the adjustment rod 106 (e.g., at an end of the adjustment rod 106). In particular, in the embodiment illustrated, the clamp nut 140 is threadably fastened to the adjustment rod 106 at a junction between the adjustment rod 106 and the support body 108, to secure the support body 108 to the adjustment rod 106. In some embodiments, the clamp nut 140 can be rotated relative to the adjustment rod 106 to axially adjust a height of the support body 108.

Generally, a support body according to the invention can include any variety of structures configured to receive and support any variety of objects. In the illustrated embodiment, for example, the support body 108 is configured as a pipe support for circular pipes, and includes a base support 142 and a fastening element 144 configured to be secured to the base support 142 to secure a pipe to base support 142, and to the support body 108 generally.

In the embodiment illustrated, the base support 142 and the fastening element 144 are configured to engage a range of pipe diameters. In this regard, for example, the base support 142 includes a base wall 146 and a pair of opposing support walls 148, 150 that extend generally perpendicularly upward (from the perspective of FIG. 1) from the base wall 146. Each of the support walls 148, 150 defines a generally V-shaped profile at a distal edge thereof. The generally V-shaped profiles of the support walls 148, 150 include two portions that extend in a downward direction (from the perspective of FIG. 1) and toward one another, to meet at a junction formed therebetween.

Similarly, the fastening element 144 is in the form of a two-legged bolt that includes a generally V-shaped linking portion 152 extending between a pair of legs 154. The generally V-shaped linking portion 152 includes two portions that extend in an upward direction (from the perspective of FIG. 1) and toward one another, to meet at a junction formed therebetween. The legs 154 generally extend axially downward (from the perspective of FIG. 1) toward the base wall 146 and are configured to extend through respective apertures formed in the base wall 146 to secure the fastening element 144 to the base support 142.

As illustrated in FIG. 1, each of the legs 154 includes external threads and is configured to be secured to the base support 142 by a corresponding leg fastening element 156 secured to a bottom surface of the base wall 146. In some embodiments, for example, the leg fastening elements 156 can be configured as push-on nuts, as other quick-install fastening elements, nuts, or as other fastening elements.

As also noted above, the generally V-shaped profiles of the support walls 148, 150 and of the linking portion 152 of the fastening element 144 can support and retain objects with a variety of external dimensions. For example, the generally V-shaped profiles defined at the distal edges of the support walls 148, 150 and at the linking portion 152 of the fastening element 144 can securely engage pipes with any number of different diameters within a particular range. As such, the support body 108 is not necessarily limited to supporting a pipe having a specific diameter and, instead, can usefully support various pipe designs having a range of diameters. In other embodiment, other configurations are possible. For example, in other embodiments, the base support 142 or the fastening element 144 can define engagement surfaces with partially circular, arcuate, rectangular, or other shapes, as desired.

Generally, a locking arrangement according to the present invention can be configured to secure a first support member to a second support member to fix a telescoped axial height of the two support members (e.g., as measured at an end plate of an upper one of the support members). In this way, for example, telescopic adjustment of telescopically nested support members can partly determine a total axial height of a support body (e.g., as measured from a base plate of the support members).

In some embodiments, sets of apertures on one support member (e.g., an inner support member) can be configured to be selectively aligned with apertures on another support member (e.g., an outer support member) to receive a locking element and thereby lock the support members against telescopic movement. In the embodiment illustrated, for example, each of the first and second sides 118, 120 of the first tube 102 includes a set (e.g., a pair) of apertures 158 disposed near (e.g., adjacent) to the first end 112 of the first tube 102. The apertures 158 are generally spaced laterally from one another and arranged at a substantially similar axial height. In this regard, the apertures 158 on the second side 120 are generally hidden from view by other components in the FIGS., but are generally in alignment with the apertures 158 on the first side 118, so that both sets of apertures 158 can simultaneously receive a fastener.

As a complementary arrangement to the apertures 158, each of the first and second sides 130, 132 of the second tube 104 includes a plurality of sets of apertures 160 arranged in axially extending rows along the first and second sides 130, 132, with predefined axial distances between each set of apertures 160 in the rows. Generally, the apertures 160 of each separate set are laterally spaced substantially similarly to the apertures 158 of the first tube 102, so that different sets of two of the apertures 160 can be selectively aligned with the apertures 158. In the embodiment illustrated, the sets of apertures 160 are spaced regularly along the second tube 104. In some embodiments, the sets of apertures 160 can be arranged with varied spacings along the second tube 104.

In other embodiments, other configurations are possible. For example, some embodiments may exhibit a reversed configuration in which rows of apertures similar to the apertures 160 are provided on an outer support (e.g., the first tube 102) and sets of apertures similar to the apertures 158 are provided on an inner support member (e.g., the second tube 104). As another example, some embodiments may exhibit rows of apertures (e.g., similar to the apertures 160) on inner and outer support members.

As also noted above, the telescopic arrangement between the first tube 102 and the second tube 104 can generally enable the second tube 104 to be axially adjusted within the internal passageway of the first tube 102. Correspondingly, the apertures 158, 160 can allow the first and second tubes 102, 104 to be selectively locked at particular telescoped heights. For example, with appropriate relative displacement of the first and second tubes 102, 104, a desired set of the apertures 160 on the first and second sides 130, 132 of the second tube 104 can be selectively axially aligned with both of the sets of the apertures 158 on the first and second sides 118, 120 of the first tube 102. Once the apertures 158 and the selected apertures 160 are aligned, separate legs of a locking element, such as a U-bolt 162, can be inserted through each of the aligned apertures 158, 160. This can lock the axial relationship between the first tube 102 and the second tube 104 and, thereby, generally set a collective, telescoped axial height of the first and second tubes 102, 104. As described below, the adjustment rod 106 can then allow for further adjustment of the axial height of the support body 108, in addition to the telescoping adjustment provided by the first tube 102 and the second tube 104.

As also noted above, in the illustrated embodiment, a locking element is provided in form of the U-bolt 162 with multiple legs. As also discussed below, this configuration can provide clearance for movement (and positioning) of the adjustment rod 106 within the first tube 102 and the second tube 104. This can be useful, for example, in order to provide larger range of possible support heights for an object, as compared to conventional designs. In other embodiments, other types of locking elements, including other locking elements with multiple legs, can be similarly used. For example, a locking element can be formed as a set of multiple bolts, a pair of threaded rods, a V-bolt, another shaped bolt, or another fastening structure.

In some embodiments, a locking arrangement can be configured to selectively constrict an outer support member relative to an inner support member. This may be useful, for example, in order to stabilize a set of telescopically nested support members, as well as to help to secure the support members at a particular telescoped height. In the embodiment illustrated, for example, the U-bolt 162 can be used to impose a clamping force on the first tube 102 and the second tube 104, in addition to blocking telescoping movement of the first and second tubes 102, 104 via insertion of the legs of the U-bolt 162 into the apertures 160, 158.

Figure 3:
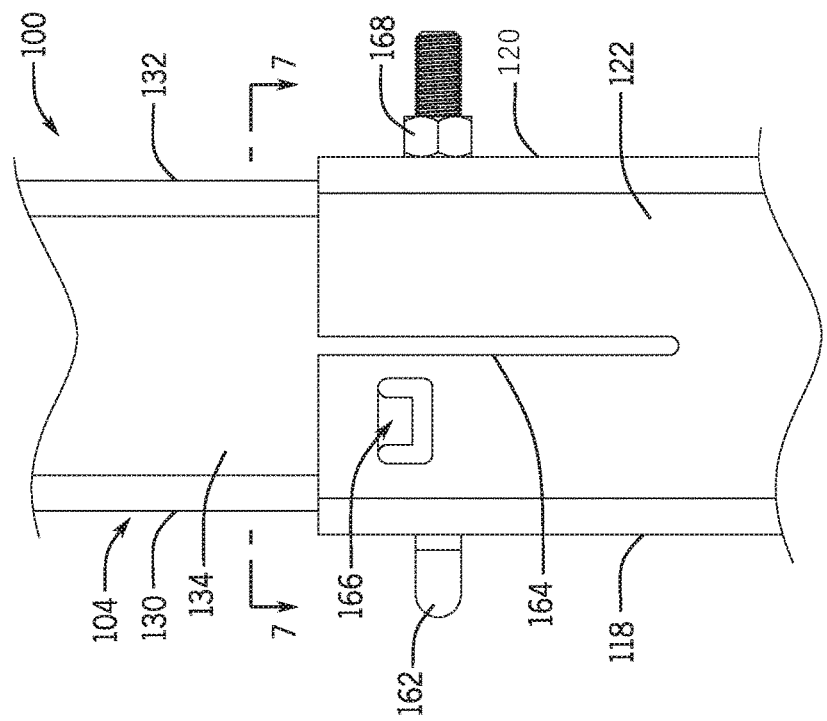
FIG. 3 is a right side elevation partial view of the junction between the first tube and the second tube of the telescoping pipe stand of FIG. 1.
Figure 2:
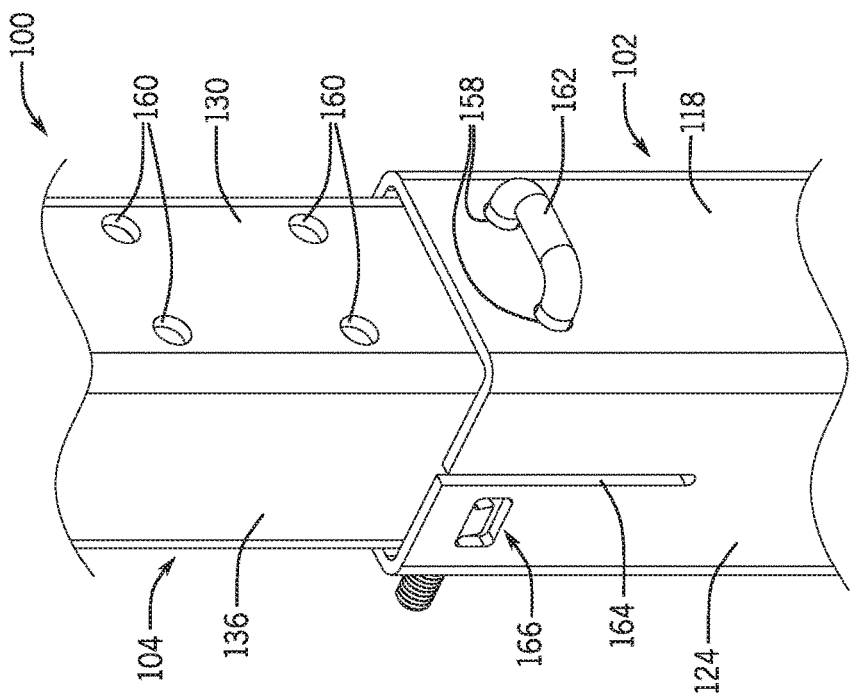
FIG. 2 is a top, front, left isometric partial view of a junction between the first tube and the second tube of the telescoping pipe stand of FIG. 1.

In particular, as illustrated in FIGS. 2 and 3, each of the third and fourth sides 122, 124 of the first tube 102 includes a compression slot 164. Each of the compression slots 164 extends generally axially from the first end 112 of the first tube 102 toward the second end 114 of the first tube 102. Generally, the compression slots 164 are configured to provide an increased degree of flexibility to the first end 112 of the first tube 102. In this regard, for example, when the U-bolt 162 is extended through the first tube 102 and the second tube 104, and a pair of nuts 168 (or other fastening elements) are tightened onto the U-bolt 162, the slots 164 can allow the first end 112 of the first tube 102 to be somewhat constricted around the second tube 104. As such, the compression slots 164 can allow the first end 112 of the first tube 102 to provide a compressive force on and around the second tube 104, when the nuts 168 are tightened to the U-bolt 162. This compressive force can reduce or remove any clearance between the first end 112 of the first tube 102 and the portion of the second tube 104 received therein, thereby substantially reducing freedom of lateral movement between the first end 112 of the first tube 102 and the enclosed portion of the second tube 104.

In some embodiments, telescoping members according to the invention can include an axial displacement stop that guards against one telescoping member being axially pulled out of another telescoping member. For example, a first tube and a second tube can include opposing structures that can be configured to interlock, when axially aligned, and prevent the second tube from further displacing axially relative to the first tube, until an outside force is provided thereto.

In the embodiment illustrated, as illustrated in FIGS. 1 through 6 in particular, each of the third and fourth sides 122, 124 of the first tube 102 includes an inwardly projecting tab 166. In the embodiment illustrated, each of the tabs 166 is formed as a generally rectangular shape within a generally horseshoe-shaped cut-out. In other embodiments, the tabs 166 can define a round shape, an arcuate shape, a polygonal shape, or another shape. Each of the third and fourth sides of the 134, 136 of the second tube 104 also includes a corresponding feature (not shown), such as an outwardly projecting tab of generally similar configuration as the inwardly projecting tabs 166.

At a predetermined relative displacement of the second tube 104 relative to the first tube 102, the tabs 166 on the first tube 102 can engage the corresponding features on the second tube 104 to generally block relative sliding movement of the first and second tubes 102, 104 in a particular direction. In this way, for example, the tabs 166 and the corresponding features on the second tube 104 can help to resist full separation of the first and second tubes 102, 104 from each other. If it is then desired to further displace the second tube 104 upward, as necessary, for example, to disassemble the telescoping pipe stand 100, an operator can use a tool (e.g., a screwdriver) to force the tabs 166 out of the way of the corresponding features on the second tube 104 (or vice versa).

In some embodiments, a further locking mechanism can be provided to restrict rotation of an adjustment element. As illustrated in FIGS. 4 and 5, for example, a set screw 172 is secured within a threaded aperture 174 on the end plate 128. The threaded aperture 174 is spaced radially from the central axis 110 by a sufficient distance to ensure that the set screw 172, when threaded into the threaded aperture 174, blocks rotation of the adjustment nut 138. In some embodiments, the threaded aperture 174 can be positioned so that a head of the set screw 172 can be tightened onto a top surface of the adjustment nut 138 to restrict rotation of the adjustment nut 138.

In some embodiments, other features can be provided to help secure the adjustment rod 106 in appropriate engagement with the first and second tubes 102, 104. For example, as illustrated in FIGS. 6 and 7 in particular, a securing nut 176 can be attached to the end of the adjustment rod 106, to be arranged within the internal passageway of the second (inner) tube 104. In the illustrated embodiment of FIGS. 6 and 7, the securing nut 176 may be in the form of a star nut having four prongs, each of which extends into a corresponding corner of the second tube 104. In other embodiments, for example, the securing nut 176 may be configured as a differently shaped nut, a clip, or another fastening element.

The securing nut 176 can generally provide lateral support to the adjustment rod 106, and thereby the support body 108. For example, a clearance between the prongs of the securing nut 176 and the inside surfaces of each of the first, second, third, and fourth sides 130, 132, 134, 136 can help to limit an angular, or lateral, displacement of the adjustment rod 106. Alternatively or additionally, the securing nut 176 may provide an axial stop for the adjustment rod 106, for example, to prevent the end of the adjustment rod 106 from being axially displaced out of the internal passageway of the second tube 104. Depending on the adjusted height of the adjustment rod 106, the securing nut 176 can be disposed axially above the U-bolt 162 (see FIG. 6) or can be disposed axially below the U-bolt 162 (see FIGS. 5 and 7).

A general example of the operation of the telescoping pipe stand 100 will be described with reference to FIGS. 1 through 7. It should be appreciated that the order of the following description is presented as an example only. In some implementations and embodiments, the operations described herein may occur in another order or be replaced with other corresponding operations.

In operation, the telescoping pipe stand 100 can generally be used to provide structural support for a pipe or other object that is to be elevated at a given height. Initially, for example, the telescoping pipe stand 100 may be placed under a pipe at a desired location along the pipe (or along an expected path for the pipe) and the base plate 116 can be attached, for example, to a floor or another structure to secure the telescoping pipe stand 100 in place.

With the base plate 116 appropriately secured, the second tube 104 can be axially displaced to set an initial height of the support body 108. The initial height can be set by aligning desired sets of the apertures 160 on the second tube 104 with both of the sets of apertures 158 on the first tube 102, as also discussed above. In this regard, for example, the telescopic arrangement between the first tube 102 and the second tube 104 can generally provide a first mode of height adjustment for the support body 108, with select magnitudes of the first mode of height adjustment generally controlled by the axial distances between the sets of apertures 160 on the second tube 104. With the illustrated axial spacing of the sets of apertures 160, for example, the first height adjustment by the telescopic arrangement between the first tube 102 and the second tube 104 may be used to provide a coarse adjustment, to generally "rough-in" the support body 108 to an approximate height of a suspended pipe.

Once the initial (e.g., "roughed-in") height of the support body 108 is set, the U-bolt 162 can be inserted through both of the pairs of apertures 158 in the first tube 102 and the appropriate sets of the apertures 160 in the second tube 104. Then the nuts 168 can be tightened onto the U-bolt 162. As also discussed above, this can generally block telescoping movement of the first and second tubes 102, 104 while also providing a clamping force on the first tube 102, to compress the compression slots 164 and thereby provide a compressive force on and around the second tube 104.

In the embodiment illustrated, because the legs of the U-bolt straddle a path of the adjustment rod 106 within the first and second tubes 102, 104, the pipe stand 100 can provide a wider range of telescoped heights than many conventional designs. For example, in some configurations, as illustrated in FIGS. 1 and 6, the first and second tubes 102, 104 can be arranged with a relatively large telescoped height, with the adjustment rod 106 and the securing nut 176 (see FIG. 6) generally above the U-bolt 162. In contrast, for example, in other configurations, as illustrated in FIGS. 4, 5, and 7, the first and second tubes 102, 104 can be arranged with a relatively small telescoped height, with the adjustment rod 106 extending past the U-bolt 162, between the two legs thereof, with the securing nut 176 generally below the U-bolt 162.

In order to further adjust the pipe stand 100 relative to a particular telescoped height of the first and second tubes 102, 104 (e.g., with the U-bolt 162 appropriately installed), the adjustment rod 106 and the adjustment nut 138 can be utilized to adjust a height of the support body 108. In some embodiments, as also discussed above, the adjustment rod 106 and the adjustment nut 138 can be used to generally provide a fine adjustment of an axial height of the support body 108, as a complement to a coarse height adjustment provided by the apertures 158, 160. For example, with the adjustment rod 106 extending freely and slidably through the end plate 128, the adjustment nut 138 can be rotated in a desired direction to adjust the height of the support body 108, with the thread geometry of the adjustment rod 106 and the degree of rotation controlling a magnitude of a slidable adjustment of the adjustment rod 106 relative to the end plate 128. In this regard, for example, the extension of the adjustment rod 106 above the end plate 128 can be adjusted without necessarily rotating the support body 108. This may be useful, for example, in order to adjust the pipe stand 100 while it is actively supporting a pipe.

In some embodiments, it may be useful to lock the adjustment nut 138 against undesired rotation. For example, as also discussed above, the set screw 172 can be installed to prevent rotation of the adjustment nut 138, thereby generally maintaining the height of the support body 108. In some embodiments, the set screw 172 can physically block rotation of the adjustment nut 138. In some embodiments, the set screw 172 can be configured to clamp the adjustment nut 138 against further rotation.

In other embodiments, other adjustment operations are possible. For example, in some embodiments, the adjustment rod 106 may be slidably adjusted relative to the end plate 128 (e.g., pulled toward a suspended pipe), and the adjustment nut 138 can then be rotated, as needed, to bring the adjustment nut 138 into engagement with the end plate 128.

Once the support body 108 is positioned at a desired height to engage at least a portion of an elevated pipe, the fastening element 144 can be secured around a portion of the pipe that is generally opposite the support walls 148, 150. Once the fastening element 144 is secured to the base support 142, the pipe may accordingly be structurally supported and secured by the telescoping pipe stand 100.

Thus, embodiments of the invention provide a telescoping pipe stand for supporting a suspended object. The improved telescoping pipe stand can provide increased ease and safety of installation. Some embodiments of the invention provide a telescoping pipe stand that can include a first height adjustment to set an initial height of a clamp and a second height adjustment to set a final height of the clamp, thereby reducing the need to custom build a pipe stand for a specific pipe height. Further, some embodiments of the invention can provide an increased range of possible support heights relative to conventional designs.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A telescoping stand for supporting a pipe, the telescoping stand comprising:
   a first support member that includes first-support apertures arranged in at least a first row;
   a second support member that includes at least a first second-support aperture;
   a third support member supported by and extending into the first and second support members;
   a support body connected to the third support member, the support body being configured to support the pipe; and
   a locking element with a first leg;
   the first and second support members being telescopically adjustable relative to each other to adjust a height of the support body, with the first row of the first-support apertures aligned with the first second-support aperture;
   the third support member being movable relative to the first and second support members to further adjust the height of the support body;
   the locking element being configured, in an installed configuration, to secure the first support member relative to the second support member via insertion of the first leg through the first second-support aperture and an aligned aperture of the first row of the first-support apertures, with the third support member extending past the locking element including the first leg; and a securing body that is connected to the third support member opposite the support body, the securing body being disposed within the first and second support members opposite the locking element from the support body when the locking element is in the installed configuration, wherein the securing body is sized to prevent the third support member from being removed from the first and second support members.

2. The telescoping stand of claim 1, wherein the securing body is configured as a lobed body.

3. The telescoping stand of claim 2, wherein the lobed body includes a plurality of lobes extending into a corresponding plurality of internal corners of an inner one of the first support member and the second support member.

4. The telescoping stand of claim 2, wherein the securing body is configured as a star nut.

5. The telescoping stand of claim 1, wherein the first-support apertures are arranged in the first row and a second row;

wherein the second support member includes a second second-support aperture; and wherein the first support member is configured as a first tube with the first and second rows of first-support apertures extending in parallel as first and second vertical rows, respectively, along a first side of the first tube; and wherein the second support member is configured as a second tube with the first and second second-support apertures extending through a first side of the second tube.

6. The telescoping stand of claim 5, wherein an outer one of the first tube and the second tube includes a free upper end and a second side that is transverse to the first side of the outer one of the first tube and the second tube; and wherein a compression slot extends along the second side from the free upper end, the compression slot being configured to be compressed by the locking element to further secure the first support member relative to the second support member.

7. The telescoping stand of claim 1, wherein the locking element is configured as a U-shaped fastener.

8. The telescoping stand of claim 7, wherein the locking element is configured as a U-bolt with the first leg and a second leg being threaded to receive nuts to secure the U-bolt to the first and second support members.

9. The telescoping stand of claim 1, wherein the third support member is configured as a threaded rod in engagement with a nut, the nut being supported by the first and second support members.

10. The telescoping stand of claim 9, wherein, to define a support height of the support body relative to the first and second support members:

the nut is configured to be rotatably adjusted relative to the threaded rod; and the threaded rod is configured to be slidably adjusted relative to the first and second support members, without rotation of the threaded rod.

11. The telescoping stand of claim 10, wherein an upper end of one of the first and second support members is configured to receive a set screw to selectively limit rotation of the nut.

12. A telescoping pipe stand for supporting an elevated object, the telescoping pipe stand comprising:

a first support member, wherein the first support member is configured as a first tube;

a second support member configured to telescopically engage with the first support member, wherein the second support member is configured as a second tube;

a third support member;

a locking element having a first leg;

an adjustment element;

the first leg being configured to engage the first and second support members, including through a first row of first-support apertures along a first side of the first tube and a second-support aperture extending through a first side of the second tube, to lock the first and second support members against relative telescopic movement, and arrange the first and second support members to provide any one of a plurality of telescoped heights; and the adjustment element being configured to rotate to dispose the third support member to support the elevated object at any one of a plurality of object heights above any of the plurality of telescoped heights, wherein an outer one of the first tube and the second tube includes a free upper end and a second side that is transverse to the first side of the outer one of the first tube and the second tube, and wherein a compression slot extends along the second side from the free upper end, the compression slot being configured to be compressed by the locking element to further secure the first support member relative to the second support member.

13. The telescoping pipe stand of claim 12, wherein the plurality of telescoped heights is a finite plurality of discrete telescoped heights; and wherein the plurality of object heights is a continuous plurality of heights above the first and second support members.

14. The telescoping pipe stand of claim 12, wherein the third support member is slidably supported relative to the first and second support member and is configured to be non-rotatably adjusted to support the elevated object at any one of the plurality of object heights.

15. The telescoping pipe stand of claim 12, wherein locking the first and second support members against relative telescopic movement includes installing the locking element to extend the first leg through the first and second support members and to clamp an outer one of the first and second support members around an inner one of the first and second support members.

16. The telescoping pipe stand of claim 12, wherein the first support member includes a first array of locking apertures and a second array of locking apertures arranged parallel to the first array of locking apertures;

wherein the second support member includes a first locking aperture and a second locking aperture;

wherein the locking element further includes a second leg; and wherein, to lock the first and second support members against relative telescopic movement, the first leg is configured to extend through the first locking aperture and any one of the locking apertures of the first array and the second leg is configured to extend through the second locking aperture and any one of the locking apertures of the second array.

17. A method of supporting an elevated object using a telescoping stand with a first support member, a second support member, a third support member, an adjustment element, and a locking element with a first leg, the method comprising:
- telescopically adjusting the first and second support members relative to each other, to provide any one of a plurality of discrete telescoped heights;
- engaging the first leg with the first and second support members, with the third support member extending past the first leg, to secure the first and second support members to provide any one of the plurality of discrete telescoped heights;
- rotating the adjustment element to slidably adjust the third support member, wherein the third support member is slidably supported relative to the first and second support member and is configured to be non-rotatably adjusted to support the elevated object at any of a continuous plurality of heights above the first and second support members; and
- supporting the elevated object with the third support member.

18. The method of claim 17, with the locking element further including a second leg, wherein engaging the first and second legs with the first and second support members includes:
- extending the first and second legs through the first and second support members to block telescopic adjustment of the first and second support members; and
- constricting an outer one of the first and second support members to clamp the outer one of the first and second support members around an inner one of the first and second support members.

19. The method of claim 17, further comprising:
- after adjusting the third support member to support the elevated object at any of the continuous plurality of heights above the first and second support members, engaging a set screw with an upper end of one of the first and second support members to prevent further rotation of the adjustment element.

* * * * *